United States Patent
Teng et al.

(10) Patent No.: US 10,784,541 B2
(45) Date of Patent: Sep. 22, 2020

(54) STORAGE BATTERY DEVICE, AND CHARGING-DISCHARGING MONITORING METHOD, DEVICE AND SYSTEM THEREOF

(71) Applicant: ZTE CORPORATION, Shenzhen (CN)

(72) Inventors: Lingqiao Teng, Shenzhen (CN); Baohang Zhou, Shenzhen (CN); Mingming Liu, Shenzhen (CN); Shihao Qin, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 489 days.

(21) Appl. No.: 15/548,940

(22) PCT Filed: Aug. 31, 2015

(86) PCT No.: PCT/CN2015/088650
§ 371 (c)(1),
(2) Date: Aug. 4, 2017

(87) PCT Pub. No.: WO2016/123969
PCT Pub. Date: Aug. 11, 2016

(65) Prior Publication Data
US 2018/0026316 A1    Jan. 25, 2018

(30) Foreign Application Priority Data

Feb. 6, 2015   (CN) .......................... 2015 1 0067786

(51) Int. Cl.
*H01M 10/44* (2006.01)
*H02J 7/00* (2006.01)
*H02J 7/35* (2006.01)

(52) U.S. Cl.
CPC .......... *H01M 10/44* (2013.01); *H02J 7/0003* (2013.01); *H02J 7/007* (2013.01); *H02J 7/0019* (2013.01);
(Continued)

(58) Field of Classification Search
CPC ...... H01M 10/44; H02J 7/0022; H02J 7/0019; H02J 7/0003; H02J 7/007; H02J 7/0029;
(Continued)

(56) References Cited

U.S. PATENT DOCUMENTS

| 5,760,570 A | 6/1998 | Nagai et al. |
| 5,801,514 A | 9/1998 | Saeki et al. |

(Continued)

FOREIGN PATENT DOCUMENTS

| CN | 202009248 | 10/2011 |
| CN | 102355040 A | 2/2012 |

(Continued)

OTHER PUBLICATIONS

International Search Report for PCT/CN2015/088650, English Translation attached to original, Both completed by the Chinese Patent Office dated Nov. 10, 2015 All together 6 Pages.
(Continued)

*Primary Examiner* — M Baye Diao
(74) *Attorney, Agent, or Firm* — Houtteman Law LLC

(57) ABSTRACT

A storage battery device, a charging and discharging monitoring method and device thereof and a corresponding system are described. The storage battery device includes multiple storage batteries connected in parallel. A storage battery switching unit connected in series with each storage battery is arranged on a parallel branch circuit where the storage battery is located, and includes a charging control unit configured to switch on or switch off a charging loop of the storage battery and a discharging control unit connected
(Continued)

in parallel with the charging control unit and configured to switch on or switch off a discharging loop of the storage battery.

19 Claims, 3 Drawing Sheets

(52) U.S. Cl.
CPC ......... *H02J 7/0022* (2013.01); *H02J 7/0024* (2013.01); *H02J 7/0026* (2013.01); *H02J 7/0029* (2013.01); *H02J 7/0021* (2013.01); *H02J 7/0068* (2013.01); *H02J 7/00302* (2020.01); *H02J 7/00304* (2020.01); *H02J 7/35* (2013.01)

(58) Field of Classification Search
CPC .... H02J 7/0026; H02J 7/0024; H02J 7/00304; H02J 7/00302; H02J 7/35; H02J 7/0068; H02J 7/002
USPC .......................................................... 320/134
See application file for complete search history.

(56) References Cited

U.S. PATENT DOCUMENTS

| | | | | |
|---|---|---|---|---|
| 7,733,060 B2* | 6/2010 | Kojima | ................ | H02J 7/0072 320/125 |
| 8,450,973 B2* | 5/2013 | Ho | ................ | H02J 7/0019 320/119 |
| 8,698,448 B2* | 4/2014 | Dong | ................ | H02J 7/0022 320/101 |
| 8,729,864 B2* | 5/2014 | Dittmer | ................ | B60L 50/40 320/134 |
| 9,024,585 B2* | 5/2015 | Nakashima | ........... | H02J 7/0019 320/117 |
| 9,116,211 B2* | 8/2015 | Zhou | ................ | G01R 31/3277 |
| 9,164,143 B2* | 10/2015 | Li | ................ | G01R 31/2827 |
| 9,496,705 B2* | 11/2016 | Tang | ................ | H02H 9/02 |
| 9,671,470 B2* | 6/2017 | Liu | ................ | G01R 31/40 |
| 9,768,612 B2* | 9/2017 | Iwasaki | ................ | H02J 3/32 |
| 10,008,862 B2* | 6/2018 | Takizawa | ........... | H01M 10/441 |
| 10,181,740 B2* | 1/2019 | Tanaka | ................ | H02J 7/007 |
| 2005/0212493 A1 | 9/2005 | Yamaguchi et al. | | |
| 2008/0118833 A1* | 5/2008 | Ueda | ................ | H01M 4/131 429/209 |
| 2009/0179616 A1* | 7/2009 | Ichikawa | ........... | H01M 10/0525 320/134 |
| 2013/0175867 A1 | 7/2013 | Park | | |
| 2014/0111164 A1* | 4/2014 | Ohkawa | ................ | G01R 31/382 320/134 |
| 2014/0361732 A1* | 12/2014 | Nishikawa | ................ | H02J 7/00 320/107 |

FOREIGN PATENT DOCUMENTS

| | | |
|---|---|---|
| CN | 102361336 | 2/2012 |
| CN | 102593907 | 7/2012 |
| CN | 202333884 U | 7/2012 |
| CN | 103312144 A | 9/2013 |
| CN | 103427121 A | 12/2013 |
| CN | 203674347 | 6/2014 |
| EP | 0911939 A2 | 4/1999 |
| EP | 2202865 A1 | 6/2010 |
| EP | 2980954 A | 2/2016 |
| WO | WO2014155986 A | 10/2014 |

OTHER PUBLICATIONS

Extended European Search Report dated Dec. 18, 2017 for European Patent Application No. 15880916.0.
China Patent Office, First Office Action dated Jun. 3, 2020 corresponding to Chinese Application No. 201510067786.3.
European Patent Office, Office Action dated Apr. 14, 2020 corresponding to EP Application No. 15880916.0.

* cited by examiner

STORAGE BATTERY DEVICE, AND CHARGING-DISCHARGING MONITORING METHOD, DEVICE AND SYSTEM THEREOF

CROSS-REFERENCE TO RELATED APPLICATIONS

This application is the U.S. national phase of PCT Application No. PCT/CN2015/088650 filed on Aug. 31, 2015, which claims priority to Chinese Patent Application No. 201510067786.3 filed on Feb. 6, 2015 the disclosures of which are incorporated in their entirety by reference herein.

TECHNICAL FIELD

The present document relates to, but is not limited to, a storage battery, and particularly to a storage battery device and a charging and discharging monitoring method, device and system thereof.

BACKGROUND

Along with development of an energy storage technology, there are more and more types of storage batteries, such as lithium storage battery, lead-acid storage battery, high-temperature storage battery and rapid charging battery. These different types of storage batteries have different characteristics, and may be selected according to usage scenarios.

During reconstruction and upgrading or capacity expansion over existing communication base stations, storage batteries of many original power systems may continue to be used. Considering an input cost problem, a user may simultaneously use two or more types of storage batteries or simultaneously use new and old storage batteries.

The following problems are brought.

1. Different types of storage batteries: a current storage battery management method mostly implements management over storage batteries of a certain type. If storage batteries of two different types are mixed for use, on one hand, performance of the storage batteries of each type may not be fully developed and utilized, and on the other hand, the performance of the storage batteries of a certain type may be reduced. Service life of a storage battery may be shortened, and even a potential safety hazard may be brought.

2. New and old storage batteries: since performance of an old storage battery is reduced and charging and discharging properties may also change, if the same storage battery parameters are used for management, deterioration of a new storage battery is accelerated.

SUMMARY

The below is the summary of a subject described in detail in the present document, and the summary is not intended to limit the scope of protection of the claims.

Embodiments of the present disclosure provide a storage battery device and a charging and discharging monitoring method, device and system thereof, so as to solve the problem of how to fully develop advantages of storage batteries of each type and ensure safety in use of the storage batteries.

An embodiment of the present disclosure provides a storage battery device, which includes multiple storage batteries connected in parallel, herein a storage battery switching unit is arranged on a parallel branch circuit where each storage battery in the multiple storage batteries is located and connected in series with the storage battery, the storage battery switching unit includes a current detection unit and a charging and discharging control unit which are connected in series, and the charging and discharging control unit includes:

a charging control unit, configured to switch on or switch off a charging loop of the storage battery, and a discharging control unit, connected in parallel with the charging control unit and configured to switch on or switch off a discharging loop of the storage battery.

In an exemplary embodiment, the charging control unit includes a subunit unidirectionally switched on in a charging direction and a switch subunit connected in series with the subunit unidirectionally switched on in a charging direction; and the discharging control unit includes a subunit unidirectionally switched on in a discharging direction and a switch subunit connected in series with the subunit unidirectionally switched on in a discharging direction.

In an exemplary embodiment, the switch subunits are contactors.

In the storage battery device, the discharging loop and charging loop of each storage battery are independently controlled to be switched on and switched off, which is favorable for switching management of different storage batteries.

The embodiments of the present disclosure provide a charging and discharging monitoring method for a storage battery device, herein the storage battery device includes multiple storage batteries connected in parallel, the method includes:

independently controlling charging state and discharging state of each storage battery in the multiple storage batteries to implement charging of the storage battery device, according to a set charging strategy; and independently controlling charging state and discharging state of each storage battery in the multiple storage batteries to implement discharging of the storage battery device according to a set discharging strategy, herein the charging state includes charging permission and charging forbiddance, and the discharging state includes discharging permission and discharging forbiddance.

In an exemplary embodiment, the storage battery device uses the abovementioned storage battery device, and independently controlling the charging state and discharging state of each storage battery in the multiple storage batteries includes: controlling the charging control unit to switch on a charging loop of the storage battery to set the storage battery in a charging permission state; controlling the charging control unit to switch off the charging loop of the storage battery to set the storage battery in a charging forbiddance state; controlling the discharging control unit to switch on a discharging loop of the storage battery to set the storage battery in a discharging permission state; and controlling the charging control unit to switch off the charging loop of the storage battery to set the storage battery in the charging forbiddance state.

In an exemplary embodiment, the set charging strategy includes:

independently charging the multiple storage batteries; or simultaneously charging the multiple storage batteries; or performing hybrid charging on the multiple storage batteries, namely simultaneously charging part of storage batteries in the multiple storage batteries and independently charging the other storage batteries.

In an exemplary embodiment, independently controlling the charging state and discharging state of each storage battery in the multiple storage batteries includes:

when a storage battery is independently charged, setting the storage battery in a charging permission and discharging permission state, and setting the other storage batteries in a charging forbiddance and discharging forbiddance state.

In an exemplary embodiment, independently controlling the charging state and discharging state of each storage battery in the multiple storage batteries includes:

when two storage batteries are simultaneously charged, setting a storage battery of the two storage batteries in the charging permission and discharging permission state, and setting the other storage battery in a charging permission and discharging forbiddance state; and if a storage battery of the two storage batteries is fully charged at first, setting the storage battery in the charging forbiddance state, and continuing charging the other storage battery.

In an exemplary embodiment, independently controlling the charging state and discharging state of each storage battery in the multiple storage batteries includes:

before two storage batteries are simultaneously charged, detecting voltages of the two storage batteries at first, then setting a storage battery of the two storage batteries of which the voltage is low in the charging permission state, and setting the other storage battery in the charging forbiddance state; and when the two storage batteries are charged to be equal in voltage, setting the other storage battery in the charging permission state.

In an exemplary embodiment, independently controlling the charging state and discharging state of each storage battery in the multiple storage batteries includes:

after the multiple storage batteries are fully charged, setting a preferentially used storage battery in the charging permission and discharging permission state, and setting the other storage batteries in a discharging forbiddance state; and setting a storage battery charged simultaneously with the preferentially used storage battery in the other storage batteries in the charging permission state, and setting a storage battery charged after the preferentially used storage battery in the charging forbiddance state.

In an exemplary embodiment, the set discharging strategy includes:

independently discharging the multiple storage batteries; or simultaneously discharging the multiple storage batteries; or performing hybrid discharging on the multiple storage batteries, namely simultaneously discharging part of storage batteries in the multiple storage batteries and independently discharging the other storage batteries.

In an exemplary embodiment, independently controlling the charging state and discharging state of each storage battery in the multiple storage batteries includes:

when a storage battery is independently discharged, setting the storage battery in the charging permission and discharging permission state, and setting the other storage batteries in the charging forbiddance and discharging forbiddance state.

In an exemplary embodiment, independently controlling the charging state and discharging state of each storage battery in the multiple storage batteries includes:

when two storage batteries are simultaneously discharged, setting a preferentially charged storage battery of the two storage batteries in the charging permission and discharging permission state, and setting the other storage battery in a charging forbiddance and discharging forbiddance state.

In an exemplary embodiment, independently controlling the charging state and discharging state of each storage battery in the multiple storage batteries includes:

when a first storage battery in the multiple storage batteries is in the charging permission and discharging permission state and a second storage battery is in the charging forbiddance and discharging forbiddance state, executing the following four operations to set the first storage battery in the charging forbiddance and discharging forbiddance state and set the second storage battery in the charging permission and discharging permission state:

① switching off a charging loop of a current storage battery;

② switching on a discharging loop of a next storage battery;

③ switching off a discharging loop of the current storage battery; and

④ switching on a charging loop of the next storage battery, herein an execution sequence of the above four operations meets one or more of the following conditions:

1) in a switching process, there is always a storage battery of which the discharging loop is in an on state in the current storage battery and the next storage battery; and 2) in a switching process, the charging loop of the other storage battery is always in an off state when the discharging loop of one storage battery in the current storage battery and the next storage battery is in an on state.

In an exemplary embodiment, the method further includes: executing one or more of the following abnormity processes:

when it is detected that a charging current(s) of one or more storage batteries exceed(s) a set charging protection threshold value in a charging process, setting the storage battery/batteries in the charging forbiddance state;

when it is detected that an abnormal discharging occurs to one or more storage batteries which are fully charged, setting the storage battery/batteries in the discharging forbiddance state; and when it is detected that a discharging current(s) of one or more storage batteries exceed(s) a set discharging protection threshold value in a discharging process, setting the storage battery/batteries in the discharging forbiddance state.

In an exemplary embodiment, the charging strategy further includes one or more of the following strategies:

simultaneously charging multiple storage batteries with the same charging parameter;

for a lithium storage battery and a lead-acid storage battery with different charging parameters, charging the lithium storage battery at first, and then charging the lead-acid storage battery; and for a new storage battery and an old storage battery of the same type but with different charging parameters, charging the new storage battery at first, and then charging the old storage battery.

In an exemplary embodiment, the discharging strategy further includes one or more of the following strategies:

simultaneously discharging multiple storage batteries of the same type;

for a lithium storage battery and a lead-acid storage battery, discharging the lithium storage battery at first, and then discharging the lead-acid storage battery; and for a lithium storage battery and a rapid charging battery, discharging the lithium storage battery at first, and then discharging the rapid charging battery.

The embodiments of the present disclosure provide a charging and discharging monitoring device for a storage battery device, the storage battery device includes multiple storage batteries connected in parallel, the charging and discharging monitoring device includes:

a charging management module, configured to independently control charging state and discharging state of each storage battery in the multiple storage batteries to implement charging of the storage battery device according to a set charging strategy; and a discharging management module, configured to independently control the charging state and discharging state of each storage battery in the multiple storage batteries to implement discharging of the storage battery device according to a set discharging strategy, herein the charging state includes charging permission and charging forbiddance, and the discharging state includes discharging permission and discharging forbiddance.

In an exemplary embodiment, the storage battery device uses the abovementioned storage battery device, and the charging management module and the discharging management module are configured to independently control the charging state and discharging state of each storage battery in the multiple storage batteries in the following manner:

controlling the charging control unit to switch on a charging loop of the storage battery to set the storage battery in a charging permission state; controlling the charging control unit to switch off the charging loop of the storage battery to set the storage battery in a charging forbiddance state; controlling the discharging control unit to switch on a discharging loop of the storage battery to set the storage battery in a discharging permission state; and controlling the charging control unit to switch off the charging loop of the storage battery to set the storage battery in the charging forbiddance state.

In an exemplary embodiment, the charging strategy used by the charging management module includes:

independently charging the multiple storage batteries; or simultaneously charging the multiple storage batteries; or performing hybrid charging on the multiple storage batteries, namely simultaneously charging part of storage batteries in the multiple storage batteries and independently charging the other storage batteries.

In an exemplary embodiment, the charging management module is configured to independently control the charging state and discharging state of each storage battery in the multiple storage batteries in the following manner:

when a storage battery is independently charged, setting the storage battery in a charging permission and discharging permission state, and setting the other storage batteries in a charging forbiddance and discharging forbiddance state.

In an exemplary embodiment, the charging management module is configured to independently control the charging state and discharging state of each storage battery in the multiple storage batteries in the following manner:

when two storage batteries are simultaneously charged, setting a storage battery of the two storage batteries in the charging permission and discharging permission state, and setting the other storage battery in a charging permission and discharging forbiddance state; and if a storage battery of the two storage batteries is fully charged at first, setting the storage battery in the charging forbiddance state, and continuing charging the other storage battery.

In an exemplary embodiment, the charging management module is configured to independently control the charging state and discharging state of each storage battery in the multiple storage batteries in the following manner:

before two storage batteries are simultaneously charged, detecting voltages of the two storage batteries at first, then setting a storage battery of the two storage batteries of which the voltage is low in the charging permission state, and setting the other storage battery in the charging forbiddance state; and when the two storage batteries are charged to be equal in voltage, setting the other storage battery in the charging permission state.

In an exemplary embodiment, the charging management module is configured to independently control the charging state and discharging state of each storage battery in the multiple storage batteries in the following manner:

after the multiple storage batteries are fully charged, setting a preferentially used storage battery in the charging permission and discharging permission state, and setting the other storage batteries in a discharging forbiddance state; and setting a storage battery charged simultaneously with the preferentially used storage battery in the other storage batteries in the charging permission state, and setting a storage battery charged after the preferentially used storage battery in the charging forbiddance state.

In an exemplary embodiment, the discharging strategy used by the discharging management module includes:

independently discharging the multiple storage batteries; or simultaneously discharging the multiple storage batteries; or performing hybrid discharging on the multiple storage batteries, namely simultaneously discharging part of storage batteries in the multiple storage batteries and independently discharging the other storage batteries.

In an exemplary embodiment, the discharging management module is configured to independently control the charging state and discharging state of each storage battery in the multiple storage batteries in the following manner:

when a storage battery is independently discharged, setting the storage battery in the charging permission and discharging permission state, and setting the other storage batteries in the charging forbiddance and discharging forbiddance state.

In an exemplary embodiment, the discharging management module is configured to independently control the charging state and discharging state of each storage battery in the multiple storage batteries in the following manner:

when two storage batteries are simultaneously discharged, setting a preferentially charged storage battery of the two storage batteries in the charging permission and discharging permission state, and setting the other storage battery in a charging forbiddance and discharging forbiddance state.

In an exemplary embodiment, the charging management module and the discharging management module are configured to independently control the charging state and discharging state of each storage battery in the multiple storage batteries in the following manner:

when a first storage battery in the multiple storage batteries is in the charging permission and discharging permission state and a second storage battery is in the charging forbiddance and discharging forbiddance state, executing the following four operations to set the first storage battery in the charging forbiddance and discharging forbiddance state and set the second storage battery in the charging permission and discharging permission state:

① switching off a charging loop of a current storage battery;

② switching on a discharging loop of a next storage battery;

③ switching off a discharging loop of the current storage battery; and

④ switching on a charging loop of the next storage battery, herein an execution sequence of the above four operations meets one or more of the following conditions:

1) in a switching process, there is always a storage battery of which the discharging loop is in an on state in the current storage battery and the next storage battery; and 2) in a switching process, the charging loop of the other storage battery is always in an off state when the discharging loop of one storage battery in the current storage battery and the next storage battery is in an on state.

In an exemplary embodiment, the device further includes:

an abnormity processing module, configured to execute one or more of the following abnormity processes:

when it is detected that a charging current(s) of one or more storage batteries exceed(s) a set charging protection threshold value in a charging process, setting the storage battery/batteries in the charging forbiddance state;

when it is detected that an abnormal discharging occurs to one or more storage batteries which are fully charged, setting the storage battery/batteries in the discharging forbiddance state; and when it is detected that a discharging current(s) of one or more storage batteries exceed(s) a set discharging protection threshold value in a discharging process, setting the storage battery/batteries in the discharging forbiddance state.

The embodiments of the present disclosure provides a computer storage medium, computer-executable instructions are stored in the computer storage medium and are used for executing the abovementioned method.

The embodiments of the present disclosure provide a storage battery charging and discharging monitoring system, which includes the abovementioned storage battery device and the abovementioned charging and discharging monitoring device.

The abovementioned method, device and system may implement hybrid charging and discharging management over multiple types of storage batteries, and may fully develop advantages according to characteristics of the storage batteries of each type to achieve a maximum investment value of a customer on the premise of ensuring safety in use of the storage batteries.

After the drawings and the detailed descriptions are read and understood, the other aspects may be understood.

DETAILED DESCRIPTION

Embodiments of the present disclosure will be described below in detail with reference to the drawings. It is important to note that the embodiments in the present disclosure and characteristics in the embodiments may be freely combined without conflicts.

Embodiment 1

Figure 1:
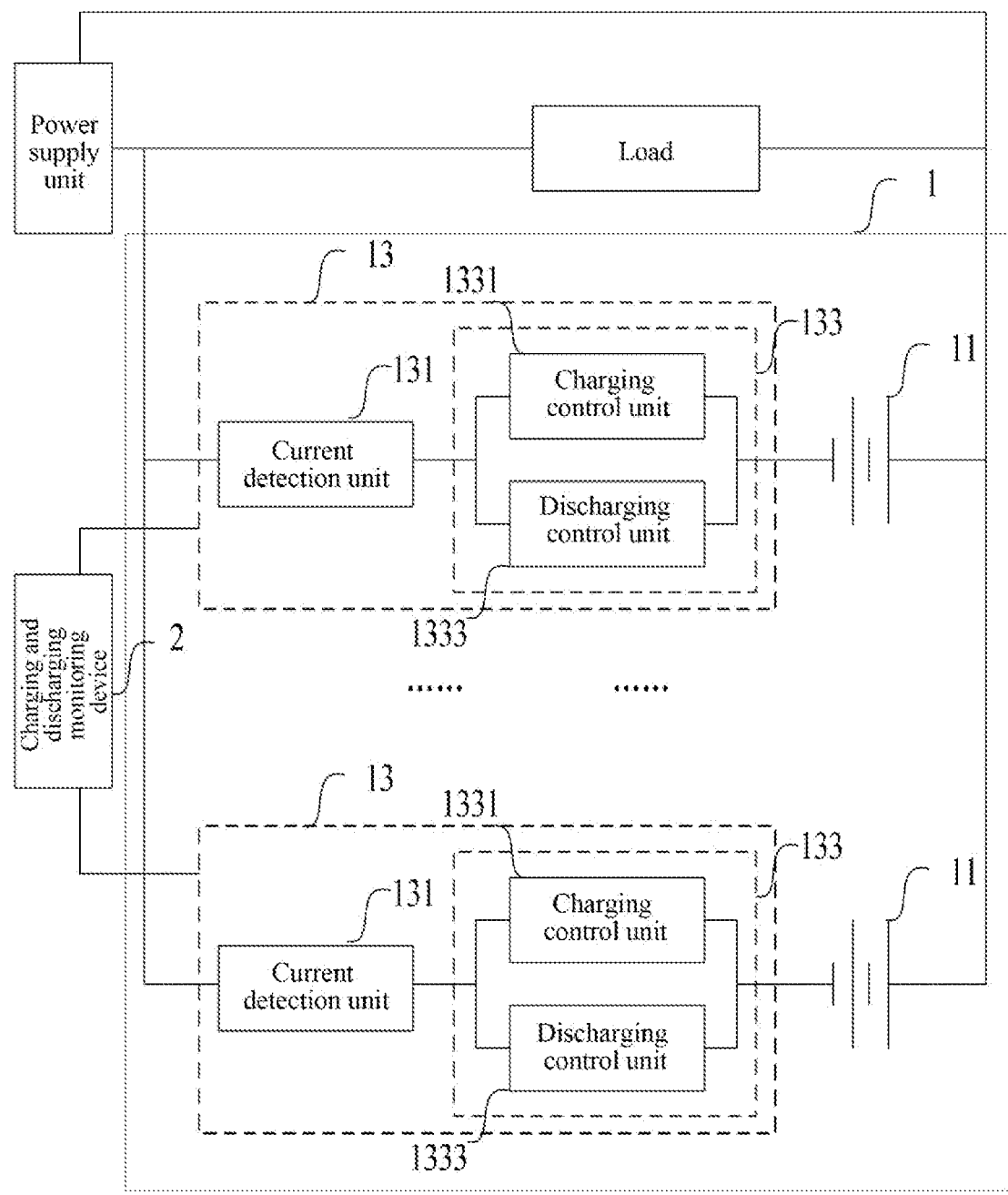
FIG. 1 is a structure diagram of a storage battery charging and discharging management system including a storage battery device according to embodiment 1 of the present disclosure and a charging and discharging monitoring device according to embodiment 2.

The embodiment provides a storage battery device 1. As shown in FIG. 1, the storage battery device 1 includes multiple storage batteries 11 connected in parallel. Although only two are shown in the figure, there may also be more than two.

A storage battery switching unit 13 connected in series with each storage battery 11 is arranged on a parallel branch circuit where the storage battery 11 is located, and the storage battery switching unit 13 includes a current detection unit 131 and a charging and discharging control unit 133 which are connected in series. A charging/discharging current detected by the current detection unit 131 can be used for overcharging and over-discharging protection and for preventing the storage batteries from mutual charging.

Figure 2:
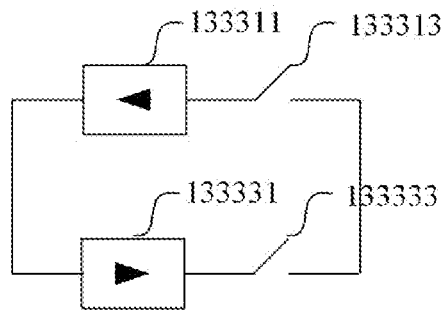
FIG. 2 is a structure diagram of a charging and discharging control unit in FIG. 1.

The charging and discharging control unit 133 includes: a charging control unit 1331, configured to switch on or switch off a charging loop of the storage battery 11, and a discharging control unit 1333, connected in parallel with the charging control unit 1331 and configured to switch on or switch off a discharging loop of the storage battery. As shown in FIG. 2, in the embodiment, the charging control unit 1331 includes a subunit 13311 unidirectionally switched on in a charging direction and a switch subunit 13313 connected in series with the subunit 13311; and the discharging control unit 1333 includes a subunit 13331 unidirectionally switched on in a discharging direction and a switch subunit 13333 connected in series with the subunit 13331. The abovementioned two switch subunits may be contactors, but are not limited to the contactors in the embodiment of the present disclosure, and all devices capable of controlling switching-on/off may be used.

A power supply unit in FIG. 1 is mainly configured to supply power to a load and charge the storage batteries. During power supply of the power supply unit, the storage batteries are discharged to provide emergent power for the load. A charging and discharging monitoring device 2 may control on/off states of the charging and discharging control units of each storage battery to implement different charging and discharging strategies according to characteristics of each storage battery, which will specifically be introduced in embodiment 2. In the figure, when each storage battery is different in voltage, and needs to be simultaneously used, a working voltage output by each storage battery may be kept consistent through a booster circuit and the like, which is unrelated to a concern of the embodiment of the present disclosure and thus will not be discussed.

It is important to note that not all components (such as voltage detection devices) and the like of charging and discharging circuits and metering circuits of the storage batteries (also called as storage battery packs or storage batteries) are drawn in the figure and another auxiliary circuit such as a charging protection circuit is also not drawn. In the figure, only part of devices closely related to implementation of state switching are shown.

The storage battery device of the embodiment may independently control switching-on/off of the charging loop and discharging loop of each storage battery, thereby implementing switching management over various types of storage batteries. The related storage batteries have no charging control units and discharging control units which are arranged respectively like in FIG. 1, and independent control over the charging and discharging states can also not be simultaneously implemented.

Embodiment 2

The embodiment provides a charging and discharging monitoring method and charging and discharging monitoring device for a storage battery device, herein the storage battery device includes multiple storage batteries connected in parallel. It is important to note that charging and discharging strategies and implementation methods for the multiple storage batteries are mainly described in the embodiment, and charging and discharging of a single storage battery has become a manure technology and will not be described in detail.

Figure 3:
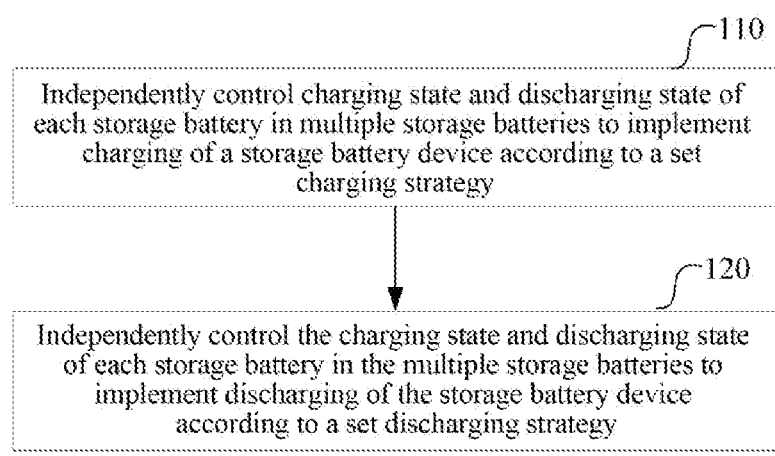
FIG. 3 is a flowchart of a charging and discharging monitoring method according to embodiment 2 of the present disclosure.

As shown in FIG. 3, a charging and discharging management method of the embodiment includes the following steps 110 and 120.

In Step 110, charging state and discharging state of each storage battery in the multiple storage batteries are independently controlled to implement charging of the storage battery device according to a set charging strategy.

In Step 120, the charging state and discharging state of each storage battery in the multiple storage batteries are independently controlled to implement discharging of the storage battery device according to a set discharging strategy.

Herein the charging state includes charging permission and charging forbiddance, and the discharging state includes discharging permission and discharging forbiddance.

A storage battery may be in one of the following four charging and discharging states:

(a) charging permission and discharging permission: a charging loop of the storage battery in this state is switched on, a discharging loop is switched on, and the storage battery may be charged and discharged;

(b) charging permission and discharging forbiddance: the charging loop of the storage battery in this state is switched on, the discharging loop is switched off, the storage battery may only be charged, and the storage battery can not be discharged;

(c) charging forbiddance and discharging permission: the charging loop of the storage battery in this state is switched off, the discharging loop is switched on, the storage battery can not be charged, but the storage battery may be discharged; and (d) charging forbiddance and discharging forbiddance: the charging loop of the storage battery in this state is switched off, the discharging loop is switched off, a storage battery pack can not be charged, and the storage battery pack can also not be discharged.

The storage battery device of the embodiment uses the storage battery device of embodiment 1, and independently controlling the charging state and discharging state of each storage battery in the multiple storage batteries includes:

controlling a charging control unit to switch on a charging loop of the storage battery to set the storage battery in a charging permission state;

controlling the charging control unit to switch off the charging loop of the storage battery to set the storage battery in a charging forbiddance state;

controlling a discharging control unit to switch on a discharging loop of the storage battery to set the storage battery in a discharging permission state; and controlling the charging control unit to switch off the charging loop of the storage battery to set the storage battery in the charging forbiddance state.

The set charging strategy in the embodiment includes:
independently charging the multiple storage batteries; or
simultaneously charging the multiple storage batteries; or
performing hybrid charging on the multiple storage batteries, namely simultaneously charging part of storage batteries in the multiple storage batteries and independently charging the other storage batteries.

The charging strategy further includes one or more of the following charging sequence related strategies:

simultaneously charging multiple storage batteries with the same charging parameter;

for a lithium storage battery and a lead-acid storage battery with different charging parameters, charging the lithium storage battery at first, and then charging the lead-acid storage battery; and for the same type of new and old storage batteries with different charging parameters, charging the new storage battery at first, and then charging the old storage battery.

For different charging strategies, different manners may be used to independently control the charging state and discharging state of each storage battery in the multiple storage batteries.

For example:

When a storage battery is independently charged, the storage battery is set in a charging permission and discharging permission state, and the other storage batteries are set in a charging forbiddance and discharging forbiddance state. In the present document, setting a certain storage battery in a certain state at a certain moment refers to that: if the storage battery is in the state before the moment, the state is kept without other control, and if the storage battery is in another state before the moment, a corresponding loop is controlled to be switched on and switched off to set the storage battery in the state at the moment.

When two storage batteries are simultaneously charged, one storage battery of the two storage batteries is set in the charging permission and discharging permission state, and the other storage battery is set in a charging permission and discharging forbiddance state. If one storage battery of the two storage batteries is fully charged at first, the storage battery is set in the charging forbiddance state, and the other storage battery is continued to be charged.

Before two storage batteries are simultaneously charged, voltages of the two storage batteries are detected at first, then the storage battery of which the voltage is low is set in the charging permission state, and the other storage battery is set in the charging forbiddance state. When the two storage batteries are charged to be equal in voltage, the other storage battery is set in the charging permission state.

After the multiple storage batteries are fully charged, independently controlling the charging state and discharging state of each storage battery in the multiple storage batteries may include: setting a preferentially used storage battery in the charging permission and discharging permission state, and setting the other storage batteries in a discharging forbiddance state; and setting a storage battery charged simultaneously with the preferentially used storage battery in the other storage batteries in the charging permission state, and setting a storage battery charged after the preferentially used storage battery in the charging forbiddance state.

The set discharging strategy of the embodiment includes:
independently discharging the multiple storage batteries; or
simultaneously discharging the multiple storage batteries; or
performing hybrid discharging on the multiple storage batteries, namely simultaneously discharging part of storage batteries in the multiple storage batteries and independently discharging the other storage batteries.

The discharging strategy further includes one or more of the following discharging sequence-related strategies:
simultaneously discharging multiple storage batteries of the same type;
for a lithium storage battery and a lead-acid storage battery, discharging the lithium storage battery at first, and then discharging the lead-acid storage battery; and
for a lithium storage battery and a rapid charging battery, discharging the lithium storage battery at first, and then discharging the rapid charging battery.

For different charging strategies, different manners may be used to independently control the charging state and discharging state of each storage battery in the multiple storage batteries. For example:

When a storage battery is independently discharged, the storage battery is set in the charging permission and discharging permission state, and the other storage batteries are set in the charging forbiddance and discharging forbiddance state.

When two storage batteries are simultaneously discharged, a preferentially charged storage battery is set in the charging permission and discharging permission state, and the other storage battery is set in the charging forbiddance and discharging forbiddance state.

No matter charging or discharging, independently controlling the charging state and discharging state of each storage battery in the multiple storage batteries may include the following switching control:

when a first storage battery in the multiple storage batteries is in the charging permission and discharging permission state and a second storage battery is in the charging forbiddance and discharging forbiddance state, executing the following four operations to set the first storage battery in the charging forbiddance and discharging forbiddance state and set the second storage battery in the charging permission and discharging permission state:

① switching off a charging loop of a current storage battery;
② switching on a discharging loop of a next storage battery;
③ switching off a discharging loop of the current storage battery;
④ switching on a charging loop of the next storage battery.

And an execution sequence of the above four operations meets one or more of the following conditions:

1) in a switching process, there is always a storage battery of which the discharging loop is in an on state in the current storage battery and the next storage battery, so that a load may be charged at any time in case of power interruption.

2) in a switching process, the charging loop of the other storage battery is always in an off state when the discharging loop of one storage battery in the current storage battery and the next storage battery is in an on state, so that a probability of mutual charging is avoided as much as possible, but mutual charging does not need to be absolutely forbidden.

In addition, the method may further execute one or more of the following abnormity processes:

when it is detected that a charging current(s) of one or more storage batteries exceed(s) a set charging protection threshold value in a charging process, setting the storage battery/batteries in the charging forbiddance state;

when it is detected that an abnormal discharging occurs to one or more storage batteries which are fully charged, setting the storage battery/batteries in the discharging forbiddance state; and when it is detected that a discharging current(s) of one or more storage batteries exceed(s) a set discharging protection threshold value in a discharging process, setting the storage battery/batteries in the discharging forbiddance state.

The embodiment of the present disclosure provides a computer storage medium, computer-executable instructions are stored in the computer storage medium and used for executing the abovementioned method.

Figure 4:
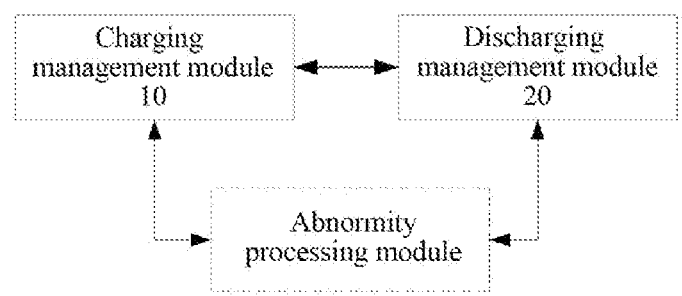
FIG. 4 is a module diagram of a charging and discharging monitoring device according to embodiment 2 of the present disclosure.

As shown in FIG. 4, the charging and discharging monitoring device for the storage battery device in the embodiment includes a charging management module 10 and a discharging management module 20.

The charging management module 10 is configured to independently control charging state and discharging state of each storage battery in the multiple storage batteries to implement charging of the storage battery device according to a set charging strategy.

The discharging management module 20 is configured to independently control the charging state and discharging state of each storage battery in the multiple storage batteries to implement discharging of the storage battery device according to a set discharging strategy.

Herein the charging state includes charging permission and charging forbiddance, and the discharging state includes discharging permission and discharging forbiddance.

It is important to note that charging and discharging management over the storage batteries also relates to acquisition, analysis and control of storage battery information, and the acquired information includes voltages, currents, temperatures and the like of the storage batteries of each type. For example, in-place states and the like of the storage batteries of each type are acquired in a manner of input dry contact detection, parameter configuration and the like. These may refer to related contents of a related technology. Contents related to control over the charging and discharging states of the storage batteries are mainly described in the embodiment.

In an implementation mode, the charging management module and the discharging management module are configured to implement independent control over the charging state and discharging state of each storage battery in the multiple storage batteries in the following manners:

controlling a charging control unit to switch on a charging loop of the storage battery to set the storage battery in a charging permission state; controlling the charging control unit to switch off the charging loop of the storage battery to set the storage battery in a charging forbiddance state; controlling a discharging control unit to switch on a discharging loop of the storage battery to set the storage battery in a discharging permission state; and controlling the charging control unit to switch off the charging loop of the storage battery to set the storage battery in the charging forbiddance state.

In an implementation mode, the charging strategy used by the charging management module includes:

independently charging the multiple storage batteries; or simultaneously charging the multiple storage batteries; or performing hybrid charging on the multiple storage batteries, namely simultaneously charging part of storage batteries in the multiple storage batteries and independently charging the other storage batteries.

In an implementation mode, the charging management module is configured to implement independent control over the charging state and discharging state of each storage battery in the multiple storage batteries in the following manner:

when a storage battery is independently charged, setting the storage battery in a charging permission and discharging permission state, and setting the other storage batteries in a charging forbiddance and discharging forbiddance state.

In an implementation mode, the charging management module is configured to implement independent control over the charging state and discharging state of each storage battery in the multiple storage batteries in the following manner:

when two storage batteries are simultaneously charged, setting one storage battery of the two storage batteries in the charging permission and discharging permission state, and setting the other storage battery in a charging permission and discharging forbiddance state; and if one storage battery of the two storage batteries is fully charged at first, setting the storage battery in the charging forbiddance state, and continuing charging the other storage battery.

In an implementation mode, the charging management module is configured to implement independent control over the charging state and discharging state of each storage battery in the multiple storage batteries in the following manner:

before two storage batteries are simultaneously charged, detecting voltages of the two storage batteries at first, then setting a storage battery of the two storage batteries of which the voltage is low in the charging permission state, and setting the other storage battery in the charging forbiddance state; and when the two storage batteries are charged to be equal in voltage, setting the other storage battery in the charging permission state.

In an implementation mode, the charging management module is configured to implement independent control over the charging state and discharging state of each storage battery in the multiple storage batteries in the following manner:

after the multiple storage batteries are fully charged, setting a preferentially used storage battery in the charging permission and discharging permission state, and setting the other storage batteries in a discharging forbiddance state; and setting a storage battery charged simultaneously with the preferentially used storage battery in the other storage batteries in the charging permission state, and setting a storage battery charged after the preferentially used storage battery in the charging forbiddance state.

In an implementation mode, the discharging strategy used by the discharging management module includes:

independently discharging the multiple storage batteries; or simultaneously discharging the multiple storage batteries; or performing hybrid discharging on the multiple storage batteries, namely simultaneously discharging part of storage batteries in the multiple storage batteries and independently discharging the other storage batteries.

In an implementation mode, the discharging management module is configured to implement independent control over the charging state and discharging state of each storage battery in the multiple storage batteries in the following manner:

when a storage battery is independently discharged, setting the storage battery in the charging permission and discharging permission state, and setting the other storage batteries in the charging forbiddance and discharging forbiddance state.

In an implementation mode, the discharging management module is configured to implement independent control over the charging state and discharging state of each storage battery in the multiple storage batteries in the following manner:

when two storage batteries are simultaneously discharged, setting a preferentially charged storage battery of the two storage batteries in the charging permission and discharging permission state, and setting the other storage battery in the charging forbiddance and discharging forbiddance state.

In an implementation mode, the charging management module and the discharging management module are configured to implement independent control over the charging state and discharging state of each storage battery in the multiple storage batteries in the following manner:

when a first storage battery in the multiple storage batteries is in the charging permission and discharging permission state and a second storage battery is in the charging forbiddance and discharging forbiddance state, executing the following four operations to set the first storage battery in the charging forbiddance and discharging forbiddance state and set the second storage battery in the charging permission and discharging permission state:

① switching off a charging loop of a current storage battery;

② switching on a discharging loop of a next storage battery;

③ switching off a discharging loop of the current storage battery; and

④ switching on a charging loop of the next storage battery.

Herein an execution sequence of the above four operations meets one or more of the following conditions:

1) in a switching process, there is always a storage battery of which the discharging loop is in an on state in the current storage battery and the next storage battery; and 2) in a switching process, the charging loop of the other storage battery is always in an off state when the discharging loop of one storage battery in the current storage battery and the next storage battery is in an on state.

In an implementation mode, the device further includes: an abnormity processing module, configured to execute one or more of the following abnormity processing:

when it is detected that a charging current(s) of one or more storage batteries exceed(s) a set charging protection threshold value in a charging process, setting the storage battery/batteries in the charging forbiddance state;

when it is detected that an abnormal discharging occurs to one or more storage batteries which are fully charged, setting the storage battery/batteries in the discharging forbiddance state; and when it is detected that a discharging current(s) of one or more storage batteries exceed(s) a set discharging protection threshold value in a discharging process, setting the storage battery/batteries in the discharging forbiddance state.

Embodiment 3

The embodiment provides a storage battery charging and discharging monitoring system, which, as shown in FIG. 1, includes the storage battery device 1 of embodiment 1 and the charging and discharging monitoring device 2 of embodiment 2.

The abovementioned embodiment implement independent charging control and independent discharging control over each storage battery by switching when different types or new and old storage batteries are mixed for use. Charging state and discharging state of each storage battery may be freely combined for flexible charging and discharging management according to a requirement of a scenario. Meanwhile, each storage battery may further include an independent current detection loop, and the storage battery is protected according to a current detection result.

Charging strategies and discharging strategies for the storage batteries are combined to obtain charging and discharging strategies, at least including:

simultaneous charging and simultaneous discharging;
independent charging and simultaneous discharging;
independent charging and independent discharging;
simultaneous charging and independent discharging;
hybrid charging and hybrid discharging;
hybrid charging and simultaneous discharging;
hybrid charging and independent discharging;
simultaneous discharging and hybrid discharging; and
independent charging and hybrid discharging, etc.

Four different charging and discharging strategies will be described below with four application examples.

Application Example 1

In the example, a strategy of independent charging and independent discharging is used for multiple storage batteries, the multiple storage batteries include a lead-acid storage battery and a lithium-iron battery. Descriptions will be made below from three aspects of a storage battery charging stage, a storage battery full-charging stage and a storage battery discharging stage respectively.

In the example, the strategy of independent charging and independent discharging is used for management over the lead-acid storage battery and the lithium-iron battery. The lithium-iron battery is preferentially charged and preferentially discharged according to a high-current charging and discharging property of the lithium-iron battery. That is, during charging, the lead-acid storage battery is charged only after the lithium-iron battery is fully charged; and during discharging, the lithium-iron battery is preferentially discharged to supply power to a load, and the lead-acid storage battery is discharged only after the lithium-iron battery is fully discharged.

1. The Storage Battery Charging Stage (1) In a lithium-iron battery charging stage, a state of the lithium-iron battery is: charging permission and discharging permission, and a state of the lead-acid storage battery is: charging forbiddance and discharging forbiddance.

(2) After the lithium-iron battery is fully charged, if the lead-acid storage battery also needs to be charged, a lead-acid storage battery charging stage is entered. When performing storage battery control unit switching, for preventing mutual charging of the storage batteries, charging and discharging control units of each storage battery are switched according to the following sequence:

① a charging loop of the lithium-iron battery is switched off;

② a discharging loop of the lead-acid storage battery is switched on;

③ a discharging loop of the lithium-iron battery is switched off; and

④ a charging loop of the lead-acid storage battery is switched on.

The above operations ① and ② may be simultaneously executed and ③ and ④ may also be simultaneously executed, which will not be described below.

That is, in the lead-acid storage battery charging stage, the state of the lithium-iron battery is: charging forbiddance and discharging forbiddance, and the state of the lead-acid storage battery is: charging permission and discharging permission.

(3) After the lithium-iron battery is fully charged, if the lead-acid storage battery does not need to be charged, the storage battery full-charging stage is directly entered.

(4) After the lead-acid storage battery is fully charged, the storage battery full-charging stage is entered.

In the storage battery charging stage, if it is detected that a charging current of a certain storage battery exceeds a charging protection threshold value, the charging control unit of this storage battery is switched off to prevent the storage battery from being overcharged.

2. The Storage Battery Full-Charging Stage (1) After the lead-acid storage battery is fully charged, the storage battery full-charging stage is entered. At this moment, the charging and discharging control units of the lithium-iron battery are all in an off state, switching may be performed to enable the lithium-iron battery to be preferentially used. For preventing mutual charging of the storage batteries, the charging and discharging control units of each storage battery are switched according to the following sequence:

① the charging loop of the lead-acid storage battery is switched off;
② the discharging loop of the lithium-iron battery is switched on;
③ the discharging loop of the lead-acid storage battery is switched off; and
④ the charging loop of the lithium-iron battery is switched on.

That is, in the storage battery full-charging stage, the state of the lithium-iron battery is: charging permission and discharging permission, and the state of the lead-acid storage battery is: charging forbiddance and discharging forbiddance.

④ the charging loop of the lead-acid storage battery is switched on.

That is, in the lead-acid storage battery discharging stage, the state of the lithium-iron battery is: charging forbiddance and discharging forbiddance, and the state of the lead-acid storage battery is: charging permission and discharging permission.

In the storage battery discharging stage, if it is detected that a discharging current of a certain storage battery exceeds a discharging protection threshold value, the discharging control unit of this storage battery is switched off to prevent the storage battery from being over-discharged.

The state of each storage battery in the example is represented in the following table set.

|  |  | Charging stage | | | Discharging stage | |
|---|---|---|---|---|---|---|
|  |  | lithium-iron battery charging stage | Lead-acid storage battery charging stage | Storage battery full-charging stage | Lithium-iron battery discharging stage | Lead-acid storage battery discharging stage |
| Lithium-iron battery | State of charging loop | On | ① Off | ④ On | On | ① Off |
|  | State of discharging loop | On | ③ Off | ② On | On | ③ Off |
| Lead-acid storage battery | State of charging loop | Off | ④ On | ① Off | Off | ④ On |
|  | State of discharging loop | Off | ② On | ③ Off | Off | ② On |

(2) After the lithium-iron battery is fully charged, the storage battery full-charging stage is entered, and the original state is kept. That is, the state of the lithium-iron battery is: charging permission and discharging permission, and the state of the lead-acid storage battery is:
charging forbiddance and discharging forbiddance.

When the charging control units of the storage batteries are switched, if it is detected that an abnormal discharging occurs to a certain storage battery which is fully charged, the discharging control unit of this storage battery may be switched off as needed to prevent mutual charging of the storage batteries.

3. The Storage Battery Discharging Stage (1) In a lithium-iron battery discharging stage, the state of the lithium-iron battery is: charging permission and discharging permission, and the state of the lead-acid storage battery is: charging forbiddance and discharging forbiddance.

(2) After the lithium-iron battery is fully discharged, if a power supply unit still doe not output energy, the lead-acid storage battery is continued to be discharged. At this moment, a lead-acid storage battery discharging stage is entered, and when performing storage battery control unit switching, for preventing mutual charging of the storage batteries, the charging and discharging control units of each storage battery are switched according to the following sequence:
① the charging loop of the lithium-iron battery is switched off;
② the discharging loop of the lead-acid storage battery is switched on;
③ the discharging loop of the lithium-iron battery is switched off; and For some uncommon special conditions, for example, power supply is recovered when the lead-acid storage battery is discharged, and power supply is interrupted when the lead-acid storage battery is charged. At this moment, whether to preferentially charge and discharge the lithium-iron battery by state switching may be flexibly set without influence on an overall effect.

Application Example 2

In the example, a strategy of independent charging and simultaneous discharging is used for multiple storage batteries, the multiple storage batteries include the same type of new and old storage batteries. Descriptions will be made below from three aspects of a storage battery charging stage, a storage battery full-charging stage and a storage battery discharging stage respectively.

In the example, the new and old storage batteries are different in service time length, and if the same charging coefficient is used for charging, a loss degree of the old storage battery may be increased. Therefore, different charging coefficients may be used for the new and old storage batteries during charging, and they may be simultaneously discharged during discharging.

1. The Storage Battery Charging Stage
(1) In a new charging stage, a state of the new storage battery is: charging permission and discharging permission, and a state of the old storage battery is: charging forbiddance and discharging forbiddance.

(2) After the new storage battery is fully charged, if the old storage battery also needs to be charged, an old storage battery charging stage is entered. When performing storage battery control unit switching, for preventing mutual charging of the storage batteries, charging and discharging control units of each storage battery are switched according to the following sequence:

① a charging loop of the new storage battery is switched off;

② a discharging loop of the old storage battery is switched on;

③ a discharging loop of the new storage battery is switched off; and

④ a charging loop of the old storage battery is switched on.

That is, in the old storage battery charging stage, the state of the new storage battery is: charging forbiddance and discharging forbiddance, and the state of the old storage battery is: charging permission and discharging permission.

(3) After the new storage battery is fully charged, if the old storage battery does not need to be charged, the storage battery full-charging stage is directly entered.

(4) After the old storage battery is fully charged, the storage battery full-charging stage is entered.

In the storage battery charging stage, if it is detected that a charging current of a certain storage battery exceeds a charging protection threshold value, the charging control unit of this storage battery is switched off to prevent the storage battery from being overcharged.

2. The Storage Battery Full-Charging Stage (1) After the old storage battery is fully charged, the storage battery full-charging stage is entered. At this moment, the charging and discharging control units of the new storage battery is all in an off state, storage battery control unit switching needs to be performed to enable the new storage battery to be preferentially used. For preventing mutual charging of the storage batteries, the charging and discharging control units of each storage battery are switched according to the following sequence:

① the charging loop of the old storage battery is switched off;

② the discharging loop of the new storage battery is switched on;

③ the discharging loop of the old storage battery is switched off; and

④ the charging loop of the new storage battery is switched on.

That is, in the storage battery full-charging stage, the state of the new storage battery is: charging permission and discharging permission, and the state of the old storage battery is: charging forbiddance and discharging forbiddance.

(2) After the new storage battery is fully charged, the storage battery full-charging stage is entered, and the original state of the control unit is kept. That is, the state of the new storage battery is: charging permission and discharging permission, and the state of the old storage battery is: charging forbiddance and discharging forbiddance.

When the charging control units of the storage batteries are switched, if it is detected that an abnormal discharging occurs to a certain storage battery which is fully charged, the discharging control unit of this storage battery may be switched off as needed to prevent mutual charging of the storage batteries.

3. The Storage Battery Discharging Stage

The new and old storage batteries are simultaneously discharged to supply power to a load. In the storage battery discharging stage, the state of the new storage battery is: charging permission and discharging permission, and the state of the old storage battery is: charging forbiddance and discharging permission.

In the storage battery discharging stage, if it is detected that a discharging current of a certain storage battery exceeds a discharging protection threshold value, the discharging control unit of this storage battery is switched off to prevent the storage battery from being over-discharged.

The two groups of storage batteries are simultaneously discharged to supply the power to the load. If it is detected that a certain storage battery has a charging current and a certain time threshold value is exceeded, the charging control unit of this storage battery is switched off to prevent the storage battery from being mutually charged for excessively long time.

The state of each storage battery in the example is represented centrally in the following table.

| | | Charging stage | | | |
|---|---|---|---|---|---|
| | | New storage battery charging stage | Old storage battery charging stage | Storage battery full-charging stage | Discharging stage |
| New storage battery | State of charging loop | On | ① Off | ④ On | On |
| | State of discharging loop | On | ③ Off | ② On | On |
| Old storage battery | State of charging loop | Off | ④ On | ① Off | Off |
| | State of discharging loop | Off | ② On | ③ Off | On |

Application Example 3

In the example, a strategy of simultaneous charging and independent discharging is used for multiple storage batteries, the multiple storage batteries include two different types of storage batteries, i.e. rapid charging battery and lithium-iron battery. Descriptions will be made below from three aspects of a storage battery charging stage, a storage battery full-charging stage and a storage battery discharging stage respectively.

In the example, a rapid charging battery and a lithium-iron battery may be charged with high currents when being charged, but have different discharging properties, and may be simultaneously charged according to characteristics of the two types of storage batteries. Since charging voltages of the rapid charging battery and the lithium-iron battery are different and the charging voltage of the lithium-iron battery is slightly lower, the lithium-iron battery needs to be switched off at first. During discharging, an independent discharging manner is used, the properties of each storage battery are developed, and the lithium-iron battery is preferentially discharged.

1. The Storage Battery Charging Stage (1) In a simultaneous charging stage, the two types of storage batteries are charged by using the same charging coefficient. A state of the lithium-iron battery is: charging permission and discharging permission, and a state of the rapid charging battery is: charging permission and discharging forbiddance. At this moment, a power supply voltage is high, and the storage batteries may usually not be mutually charged.

(2) The lithium-iron battery reaches the charging voltage at first, that is, they are fully charged at first, the rapid charging battery needs to be continuously charged, a charging loop of the lithium-iron battery is directly switched off. At this moment, the state of the lithium-iron battery is: charging forbiddance and discharging permission, and the state of the rapid charging battery is: charging permission and discharging forbiddance.

At this moment, the charging voltage of the rapid charging battery is higher and the charging loop of the lithium-iron battery is forbidden, so that mutual charging may be prevented.

(3) After the rapid charging battery is fully charged, the storage battery full-charging stage is entered.

In the storage battery charging state, if it is detected that a charging current of a certain storage battery exceeds a charging protection threshold value, the charging control unit of the storage battery is switched off to prevent the storage battery from being overcharged.

When the two types of storage batteries are simultaneously charged, for preventing mutual charging of the storage batteries, a charging loop of a storage battery of which the voltage is low may be closed at first. And when the voltages are equal after charging, the charging loop of the storage battery of the other type is closed for simultaneous charging. A specific control strategy is adjusted according to different usage scenarios of the storage batteries.

2. The Storage Battery Full-Charging Stage (1) After the rapid charging battery is fully charged, the storage battery full-charging stage is entered. At this moment, the charging control units of the lithium-iron battery is switched on to ensure free charging. Discharging control units are set in an on state to enable the lithium-iron battery to be preferentially used. At this moment, the state of the lithium-iron battery is: charging permission and discharging permission, and the state of the rapid charging battery is: charging permission and discharging forbiddance.

When the charging control units of the storage batteries are switched, if it is detected that an abnormal discharging occurs to a certain storage battery which is fully charged, the discharging control unit of this storage battery may be switched off as needed to prevent mutual charging of the storage batteries.

3. The Storage Battery Discharging Stage (1) In a lithium-iron battery discharging stage, for preventing mutual charging of the storage batteries, it is necessary to switch off a charging control unit of a rapid charging battery. At this moment, the state of the lithium-iron battery is: charging permission and discharging permission, and the state of the rapid charging battery is: charging forbiddance and discharging forbiddance.

(2) After the lithium-iron battery is fully discharged, if a power supply unit still does not output energy, the rapid charging battery is continued to be discharged. At this moment, a rapid charging battery discharging stage is entered. When performing storage battery control unit switching, for preventing mutual charging of the storage batteries, the charging and discharging control units of each storage battery are switched according to the following sequence:

① the charging loop of the lithium-iron battery is switched off;

② the discharging loop of the rapid charging battery is switched on;

③ the discharging loop of the lithium-iron battery is switched off; and

④ the charging loop of the rapid charging battery is switched on.

That is, in the rapid charging battery discharging stage, the state of the lithium-iron battery is: charging forbiddance and discharging forbiddance, and the state of the rapid charging battery is: charging permission and discharging permission.

In the storage battery discharging stage, if it is detected that a discharging current of a certain storage battery exceeds a discharging protection threshold value, the discharging control unit of this storage battery is switched off to prevent the storage battery from being over-discharged.

The charging state and discharging state of each storage battery in the example are represented centrally in the following table.

| | | Charging stage | | | Discharging stage | |
|---|---|---|---|---|---|---|
| | | Simultaneous charging stage | Rapid charging battery independent charging stage | Storage battery full-charging stage | Lithium-iron battery discharging stage | Rapid charging battery discharging stage |
| Lithium-iron storage battery | State of charging loop | On | Off | On | On | ① Off |
| | State of discharging loop | On | On | On | On | ③ Off |
| Rapid charging storage battery | State of charging loop | On | On | On | Off | ④ On |
| | State of discharging loop | Off | Off | Off | Off | ② On |

Application Example 4

In the example, a strategy of independent charging and hybrid discharging is used for multiple storage batteries, the multiple storage batteries include different types with new and old storage batteries being mixedly used. By taking two types (lead-acid storage battery and lithium-iron battery) and the lead-acid storage batteries including new and old storage batteries as an example, descriptions will be made below from three aspects of a storage battery charging stage, a storage battery full-charging stage and a storage battery discharging stage respectively.

In the example, there exist different types of storage batteries and the storage batteries of the same type include new and old ones. Therefore, the strategies of the above two examples are comprehensively considered, during charging. Different charging coefficients are used for the new and old lead-acid storage batteries and the lithium-iron battery, and during discharging, the lead-acid storage battery and the lithium-iron battery are discharged in a time division manner. And the new and old lead-acid storage batteries may be simultaneously discharged.

1. The Storage Battery Charging Stage (1) In a lithium-iron battery charging stage, a state of the lithium-iron battery is: charging permission and discharging permission, and a state of the lead-acid storage battery is: charging forbiddance and discharging forbiddance.

(2) After the lithium-iron battery is fully charged, if the lead-acid storage battery also need to be charged, a new lead-acid storage battery charging stage is entered. When performing storage battery control unit switching, for preventing mutual charging of the storage batteries, charging and discharging control units of each storage battery are switched according to the following sequence:

1 a charging loop of the lithium-iron battery is switched off;

2 a discharging loop of the new lead-acid storage battery is switched on;

3 a discharging loop of the lithium-iron battery is switched off; and 4 a charging loop of the new lead-acid storage battery is switched on, and the state of the old lead-acid storage battery is kept unchanged.

That is, in the new lead-acid storage battery charging stage, the state of the lithium-iron battery is: charging forbiddance and discharging forbiddance, the state of the new lead-acid storage battery is: charging permission and discharging permission, and the state of the old lead-acid storage battery is: charging forbiddance and discharging forbiddance.

(3) After the lithium-iron battery is fully charged, if the new lead-acid storage battery does not need to be charged, a lead-acid storage battery charging stage is directly entered.

(4) After the new lead-acid storage battery is fully charged, if the old lead-acid storage battery also needs to be charged, an old lead-acid storage battery charging stage is entered. When performing storage battery control unit switching, for preventing mutual charging of the storage batteries, the charging and discharging control units of each storage battery are switched according to the following sequence:

① the charging loop of the new lead-acid storage battery is switched off;

② discharging loop of the old lead-acid storage battery is switched on;

③ the discharging loop of the new lead-acid storage battery is switched off; and ④ charging loop of the old lead-acid storage battery is switched on, and the state of the lithium-iron battery is kept unchanged.

That is, in the old lead-acid storage battery charging stage, the state of the lithium-iron battery is: charging forbiddance and discharging forbiddance, the state of the new lead-acid storage battery is: charging forbiddance and discharging forbiddance, and the state of the old lead-acid storage battery is: charging permission and discharging permission.

(5) After the new lead-acid storage battery is fully charged, if the old lead-acid storage battery does not need to be charged, the storage battery full-charging stage is directly entered.

(6) After the old lead-acid storage battery is fully charged, the storage battery full-charging stage is entered.

In the storage battery charging stage, if it is detected that a charging current of a certain storage battery exceeds a charging protection threshold value, the charging control unit of this storage battery is switched off to prevent the storage battery from being overcharged.

2. The Storage Battery Full-Charging Stage (1) After the old lead-acid storage battery is fully charged, the storage battery full-charging stage is entered, at this moment, the charging and discharging control units of the lithium-iron battery are all in an off state. Storage battery control unit switching needs to be performed to enable the lithium-iron battery to be preferentially used. And for preventing mutual charging of the storage batteries, the charging and discharging control units of each storage battery are switched according to the following sequence:

① the charging loop of the old lead-acid storage battery is switched off;

② the discharging loop of the lithium-iron battery is switched on;

③ the discharging loop of the old lead-acid storage battery is switched off; and ④ the charging loop of the lithium-iron battery is switched on, and the state of the new lead-acid storage battery is kept unchanged.

That is, in the storage battery full-charging stage, the state of the lithium-iron battery is: charging permission and discharging permission, the state of the new lead-acid storage battery is: charging forbiddance and discharging forbiddance, and the state of the old lead-acid storage battery is: charging forbiddance and discharging forbiddance.

(2) After the new lead-acid storage battery is fully charged, the storage battery full-charging stage is entered. At this moment, the charging and discharging control units of the lithium-iron battery is all in the off state. Storage battery control unit switching needs to be performed to enable the lithium-iron battery to be preferentially used. And for preventing mutual charging of the storage batteries, the charging and discharging control units of each storage battery are switched according to the following sequence:

① the charging loop of the new lead-acid storage battery is switched off;

② the discharging loop of the lithium-iron battery is switched on;

③ the discharging loop of the new lead-acid storage battery is switched off; and ④ the charging loop of the lithium-iron battery is switched on, and the state of the old lead-acid storage battery is kept unchanged.

That is, in the storage battery full-charging stage, the state of the lithium-iron battery is: charging permission and discharging permission, the state of the new lead-acid storage battery is: charging forbiddance and discharging forbiddance, and the state of the old lead-acid storage battery is: charging forbiddance and discharging forbiddance.

(3) After the lithium-iron battery is fully charged, the storage battery full-charging state is entered, and the original states of the control units are kept. That is, the state of the lithium-iron battery is: charging permission and discharging permission, the state of the new lead-acid storage battery is:

charging forbiddance and discharging forbiddance, and the state of the old lead-acid storage battery is: charging forbiddance and discharging forbiddance.

When the charging control units of the storage batteries are switched, if it is detected that an abnormal discharging occurs to a certain storage battery which is fully charged, the discharging control unit of this storage battery may be switched off as needed to prevent mutual charging of the storage batteries.

3. The Storage Battery Discharging Stage (1) In a lithium-iron battery discharging stage, the state of the lithium-iron battery is: charging permission and discharging permission, the state of the new lead-acid storage battery is: charging permission and discharging permission, and the state of the old lead-acid storage battery is: charging forbiddance and discharging forbiddance.

In the storage battery discharging stage, if it is detected that a discharging current of a certain storage battery exceeds a discharging protection threshold value, the discharging control unit of this storage battery is switched off to prevent the storage battery from being over-discharged.

The charging state and discharging state of each storage battery in the example is represented centrally in the following table.

|  |  | Charging stage | | | | | Discharging stage | |
|---|---|---|---|---|---|---|---|---|
|  |  | Lithium-iron battery charging stage | Lead-acid storage battery charging stage (new) | Lead-acid storage battery charging stage (old) | Storage battery full-charging stage (new) | Storage battery full-charging stage (old) | Lithium-iron battery discharging stage | Lead-acid storage battery discharging stage (new and old) |
| Lithium-iron battery | State of charging loop | On | ① Off | Off | ④ On | ④ On | On | ① Off |
|  | State of discharging loop | On | ③ Off | Off | ② On | ② On | On | ④ Off |
| Lead-acid storage battery (new) | State of charging loop | Off | ④ On | ① Off | ① Off | Off | Off | ⑤ On |
|  | State of discharging loop | Off | ② On | ③ Off | ③ Off | Off | Off | ② On |
| Lead-acid storage battery (old) | State of charging loop | Off | Off | ④ On | Off | ① Off | Off | Off |
|  | State of discharging loop | Off | Off | ② On | Off | ③ Off | Off | ③ On | battery is: charging forbiddance and discharging forbiddance, and the state of the old lead-acid storage battery is: charging forbiddance and discharging forbiddance.

(2) After the lithium-iron battery is fully discharged, if a power supply unit still does not output energy, the lead-acid storage battery is continued to be discharged. At this moment, new and old lead-acid storage batteries simultaneously discharge. When performing storage battery control unit switching, for preventing mutual charging of the storage batteries, the charging and discharging control units of each storage battery are switched according to the following sequence:

① the charging loop of the lithium-iron battery is switched off;

② the discharging loop of the new lead-acid storage battery is switched on;

③ the discharging loop of the old lead-acid storage battery is switched on;

④ the discharging loop of the lithium-iron battery is switched off; and

⑤ the charging loop of the new lead-acid storage battery is switched on.

The state of the charging control unit of the old lead-acid storage battery is kept unchanged.

That is, in the lead-acid storage battery discharging stage, the state of the lithium-iron battery is: charging forbiddance and discharging forbiddance, the state of the new lead-acid Application Example 5

Figure 5:
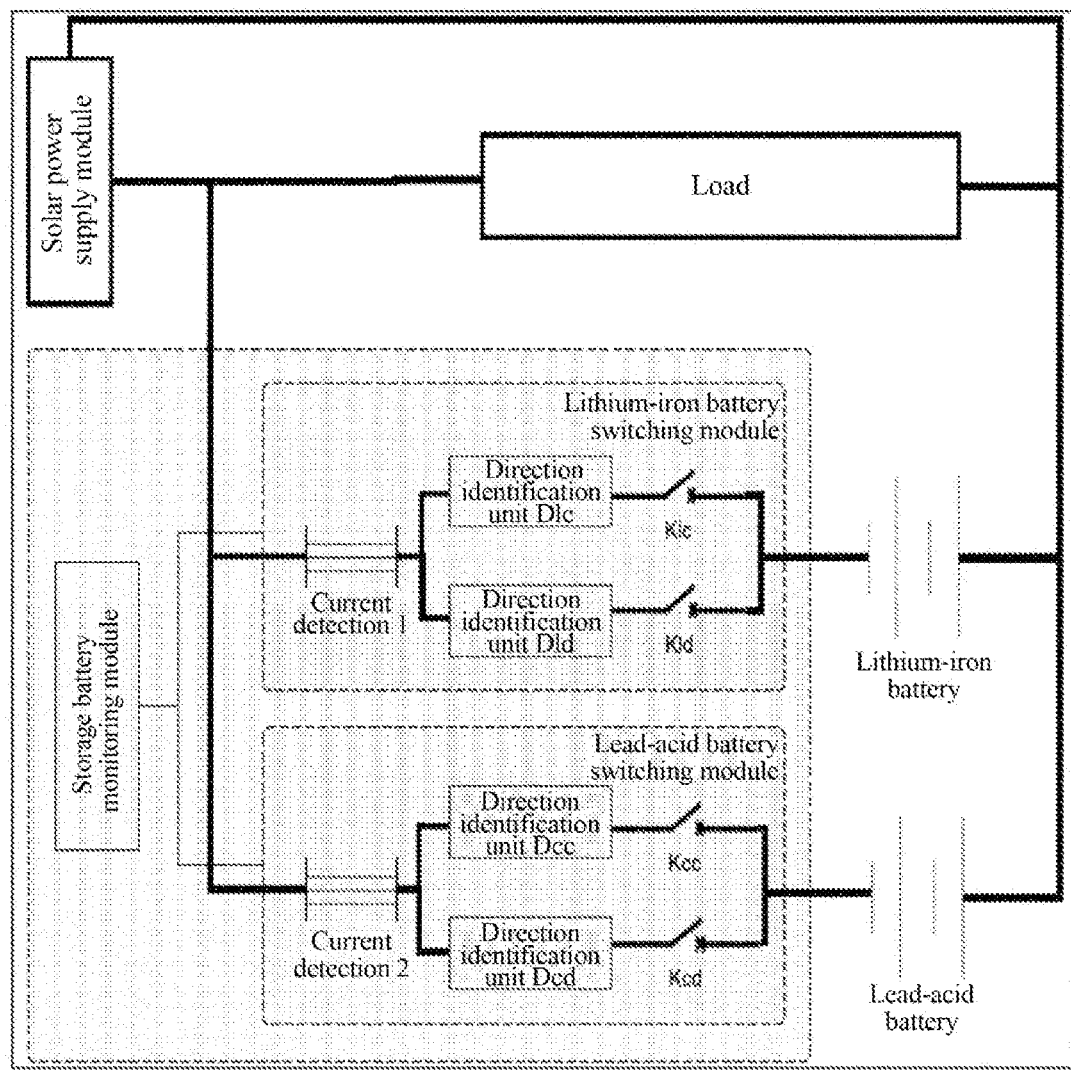
FIG. 5 is a structure diagram of a storage battery charging and discharging management system according to an application example of the present disclosure.

In the example, two types of lead-acid and lithium-iron storage batteries are used as a supplement of solar energy in a communication power supply powered by the solar energy. As shown in FIG. 5, the communication power supply of the example consists of a solar power supply module, a storage battery monitoring module, a lithium-iron battery switching module, a lead-acid storage battery switching module, a load and a hybrid storage battery including the lead-acid storage battery and lithium-iron battery connected in parallel. In the daytime, the solar energy supplies power to the load, and simultaneously supplies power to the storage batteries. In case of relatively weak light or at night, the storage batteries supply power to the load. Therefore, uninterrupted power supply of the load is ensured.

The storage battery monitoring module is configured to detect currents and voltages of the two groups of storage batteries and perform relay switch control and charging and discharging overcurrent protection.

Structures of the lithium-iron battery switching module and the lead-acid storage battery switching module are shown in FIG. 5. A charging control unit includes a direction identification unit D1c (a subunit unidirectionally switched on in a charging direction in the embodiment) and a relay K1c. A discharging control unit includes a direction identification unit D1d (a subunit unidirectionally switched on in a discharging direction in the embodiment) and a relay K1d. For example, the charging and discharging control units of the lithium-iron battery have the following characteristics:

① when the lithium-iron battery supplies power to the load, the direction identification unit D1d in the discharging control unit is switched on, the relay K1d is closed, and the whole discharging control unit is in an on state.

② at this moment, the direction identification unit D1c in the charging control unit is reversely cut off, the relay K1c is closed, and the whole charging control unit is in a pre-on state, so that the lithium-iron battery may be charged immediately when the solar energy is sufficient.

In the example, a charging current of the lithium-iron battery is defined as $I_L$, and a charging current of the lead-acid storage battery is defined as $I_C$, where $I_L > I_C$.

A flow of a method of the example of the present disclosure will be described below. When the solar energy is sufficient, the solar energy supplies power to the load, and simultaneously charges the storage batteries. A charging flow includes the following steps 1-7.

In Step 1, whether the lithium-iron battery needs to be charged is judged, it is to enter Step 4 if charging is not needed, and it is to enter Step 2 if charging is needed.

In Step 2, it is ensured that the relay K1c of the charging control unit and relay K1d of the discharging control unit of the lithium-iron battery are in a closed state and the discharging control unit of the lithium-iron battery is in the pre-on state at this moment, so that the lithium-iron battery may immediately supply power to the load when the solar energy is insufficient.

In Step 3, it is ensured that a relay Kcc of a charging control unit and a relay Kcd of a discharging control unit of the lead-acid storage battery are switched off.

In Step 4, when the lithium-iron battery is fully charged, the relay K1c of the charging control unit of the lithium-iron battery is switched off and the relay Kcd of the discharging control unit of the lead-acid storage battery is closed, to avoid mutual charging of the discharging storage batteries.

In Step 5, the relay K1d of the discharging control unit of the lithium-iron battery is switched off and the relay Kcc of the charging control unit of the lead-acid storage battery is closed, to charge the lead-acid storage battery.

In Step 6, after the lead-acid storage battery is fully charged, for preferentially using the lithium-iron battery, the relay Kcc of the charging control unit of the lead-acid storage battery is switched off and the relay K1d of the discharging control unit of the lithium-iron battery is closed.

In Step 7, the relay Kcd of the discharging control unit of the lead-acid storage battery is switched off and the relay K1c of the charging control unit of the lithium-iron battery is closed to end charging.

In case of insufficient solar energy or at night, the storage batteries supply power to the load. A discharging processing flow includes the following steps A-D.

In Step A, during power supply with the solar energy, it is ensured that the relay K1d of the discharging control unit of the lithium-iron battery is in an off state to enable the lithium-iron battery to be preferentially used during discharging. The relay K1c of the charging control unit of the lithium-iron battery is closed, the charging control unit of the lithium-iron battery is in the pre-on state. If a system is powered in a discharging process of the lithium-iron battery, the lithium-iron battery is immediately charged, and it is to enter Step 1.

In Step B, the relay Kcc of the charging control unit and relay Kcd of the discharging control unit of the lead-acid storage battery are switched off, to avoid power of the lithium-iron battery flowing to the lead-acid storage battery.

In Step C, when the lithium-iron battery reaches a discharging voltage threshold value, the relay K1c of the charging control unit of the lithium-iron battery is switched off at first, then the relay Kcd of the discharging control unit of the lead-acid storage battery is closed, and then the relay K1d of the discharging control unit of the lithium-iron battery is switched off, and finally the relay Kcc of the charging control unit of the lead-acid storage battery is closed to enable the lead-acid storage battery to supply power to the load.

In Step D, if the system is powered during discharging of the lead-acid storage battery, the relay Kcc of the charging control unit of the lead-acid storage battery is switched off, the relay K1c of the charging control unit of the lithium-iron battery is closed, the relay K1d of the discharging control unit of the lithium-iron battery is closed, and the relay Kcd of the discharging control unit of the lead-acid storage battery is switched off to end discharging.

Each of the above examples is only the example and explanation of charging and discharging management for a storage battery mixed usage scenario which is relatively common at present. In a specific implementation process, transformation of storage battery charging and discharging state may be more complicated. For example, in the first example, when the power supply unit is powered in a discharging process of the lithium-iron battery, the storage battery immediately enters a charging state, a charging and discharging switching logic of the two groups of storage batteries is not described in the first example. However, control state changes of all the charging and discharging units fall within the scope of protection of the present disclosure, and are not intended to form improper limits to the present application.

By the method and device of the abovementioned embodiments and examples, hybrid charging and discharging management over multiple types of storage batteries may be implemented, and advantages may be fully developed according to characteristics of the storage batteries of each type to achieve a maximum investment value of a customer on the premise of ensuring safety in use of the storage batteries.

The above contents are further detailed descriptions made to the present disclosure with reference to specific implementation modes, and it does not mean that specific implementation of the present disclosure is only limited to these descriptions.

Those skilled in the art should know that all or part of the steps of the abovementioned embodiments may be implemented by a flow of a computer program, the computer program may be stored in a computer-readable storage medium, the computer program is executed on a corresponding hardware platform (such as a system, equipment, a device and an apparatus), and during execution, one or combination of the steps of the method embodiment is included.

Alternatively, all or part of the steps of the abovementioned embodiments may also be implemented by virtue of an integrated circuit, these steps may be manufactured into multiple integrated circuit modules respectively, or multiple modules or steps therein are manufactured into a single integrated circuit module for implementation.

Each device/function module/function unit in the abovementioned embodiments may be implemented by using a universal computing device, and they may be concentrated on a single computing device, and may also be distributed on a network formed by multiple computing devices.

When being implemented in form of software function module and sold or used as an independent product, each device/function module/function unit in the abovementioned embodiments may be stored in a computer-readable storage medium. The abovementioned computer-readable storage medium may be a read-only memory, a magnetic disk, an optical disk and the like.

INDUSTRIAL APPLICABILITY

The abovementioned solutions may implement hybrid charging and discharging management over multiple types of storage batteries, and may fully develop advantages according to characteristics of the storage batteries of each type to achieve a maximum investment value of a customer on the premise of ensuring safety in use of the storage batteries.

What we claim is:

1. A storage battery device comprising a plurality of storage batteries connected in parallel, wherein the device comprises:
    a storage battery switching unit, the storage battery switching unit being arranged on a parallel branch circuit where each storage battery in the plurality of storage batteries is located and the storage battery switching unit being connected in series with the storage battery, wherein the storage battery switching unit comprises a current detection unit and a charging and discharging control unit which are connected in series, and the charging and discharging control unit comprises:
    a charging control unit, configured to switch on or switch off a charging loop of the storage battery, and
    a discharging control unit, connected in parallel with the charging control unit and configured to switch on or switch off a discharging loop of the storage battery,
    wherein the charging control unit is configured to simultaneously charge the plurality of storage batteries, or perform hybrid charging on the plurality of storage batteries, namely simultaneously charging part of storage batteries in the plurality of storage batteries and independently charging the other storage batteries.

2. The storage battery device according to claim 1, wherein
    the charging control unit comprises a subunit unidirectionally switched on in a charging direction and a switch subunit connected in series with the subunit unidirectionally switched on in a charging direction; and
    the discharging control unit comprises a subunit unidirectionally switched on in a discharging direction and a switch subunit connected in series with the subunit unidirectionally switched on in a discharging direction, and,
    the switch subunits are contactors.

3. A charging and discharging monitoring method for a storage battery device comprising a plurality of storage batteries connected in parallel, comprising:
    independently controlling charging state and discharging state of each storage battery in the plurality of storage batteries to implement charging of the storage battery device, according to a set charging strategy; and
    independently controlling charging state and discharging state of each storage battery in the plurality of storage batteries to implement discharging of the storage battery device, according to a set discharging strategy,
    wherein the charging state comprises charging permission and charging forbiddance, and the discharging state comprises discharging permission and discharging forbiddance,
    wherein the set charging strategy comprises:
    simultaneously charging the plurality of storage batteries; or
    performing hybrid charging on the plurality of storage batteries, namely simultaneously charging part of storage batteries in the plurality of storage batteries and independently charging the other storage batteries.

4. The method according to claim 3, wherein
    the storage battery device is a storage battery device comprising a plurality of storage batteries connected in parallel, wherein the device comprises:
    a storage battery switching unit, the storage battery switching unit being arranged on a parallel branch circuit where each storage battery in the plurality of storage batteries is located and—the storage battery switching unit being connected in series with the storage battery, wherein the storage battery switching unit comprises a current detection unit and a charging and discharging control unit which are connected in series, and the charging and discharging control unit comprises:
    a charging control unit, configured to switch on or switch off a charging loop of the storage battery, and
    a discharging control unit, connected in parallel with the charging control unit and configured to switch on or switch off a discharging loop of the storage battery, and
    independently controlling the charging state and discharging state of each storage battery in the plurality of storage batteries comprises:
    controlling the charging control unit to switch on a charging loop of the storage battery to set the storage battery in a charging permission state; controlling the charging control unit to switch off the charging loop of the storage battery to set the storage battery in a charging forbiddance state; controlling the discharging control unit to switch on a discharging loop of the storage battery to set the storage battery in a discharging permission state; and controlling the discharging control unit to switch off the discharging loop of the storage battery to set the storage battery in a discharging forbiddance state.

5. The method according to claim 3, wherein
    the charging strategy further comprises one or more of the following strategies:
    simultaneously charging a plurality of storage batteries with the same charging parameter;
    for a lithium storage battery and a lead-acid storage battery with different charging parameters, charging the lithium storage battery at first, and then charging the lead-acid storage battery; and
    for a new storage battery and an old storage battery of the same type but with different charging parameters, charging the new storage battery at first, and then charging the old storage battery.

6. The method according to claim 5, wherein
    independently controlling the charging state and discharging state of each storage battery in the plurality of storage batteries comprises:
    when a storage battery is independently charged, setting the storage battery in a charging permission and discharging permission state, and setting the other storage batteries in a charging forbiddance and discharging forbiddance state, or, independently controlling the charging state and discharging state of each storage battery in the plurality of storage batteries comprises:

when two storage batteries are simultaneously charged, setting a storage battery of the two storage batteries in the charging permission and discharging permission state, and setting the other storage battery in a charging permission and discharging forbiddance state; and when a storage battery of the two storage batteries is fully charged at first, setting the storage battery in the charging forbiddance state, and continuing charging the other storage battery, or, independently controlling the charging state and discharging state of each storage battery in the plurality of storage batteries comprises:

before two storage batteries are simultaneously charged, detecting voltages of the two storage batteries at first, then setting a storage battery of the two storage batteries of which the voltage is low in the charging permission state, and setting the other storage battery in the charging forbiddance state; and when the two storage batteries are charged to be equal in voltage, setting the other storage battery in the charging permission state, or, independently controlling the charging state and discharging state of each storage battery in the plurality of storage batteries comprises:

after the plurality of storage batteries are fully charged, setting a preferentially used storage battery in the charging permission and discharging permission state, and setting the other storage batteries in a discharging forbiddance state; and setting a storage battery charged simultaneously with the preferentially used storage battery in the other storage batteries in the charging permission state, and setting a storage battery charged after the preferentially used storage battery in the charging forbiddance state.

7. The method according to claim 3, wherein the set discharging strategy comprises:

independently discharging the plurality of storage batteries; or simultaneously discharging the plurality of storage batteries; or performing hybrid discharging on the plurality of storage batteries, namely simultaneously discharging part of storage batteries in the plurality of storage batteries and independently discharging the other storage batteries, and, wherein the discharging strategy further comprises one or more of the following strategies:

simultaneously discharging a plurality of storage batteries of the same type;

for a lithium storage battery and a lead-acid storage battery, discharging the lithium storage battery at first, and then discharging the lead-acid storage battery; and for a lithium storage battery and a rapid charging battery, discharging the lithium storage battery at first, and then discharging the rapid charging battery.

8. The method according to claim 7, wherein independently controlling the charging state and discharging state of each storage battery in the plurality of storage batteries comprises:

when a storage battery is independently discharged, setting the storage battery in the charging permission and discharging permission state, and setting the other storage batteries in the charging forbiddance and discharging forbiddance state, or, independently controlling the charging state and discharging state of each storage battery in the plurality of storage batteries comprises:

when two storage batteries are simultaneously discharged, setting a preferentially charged storage battery of the two storage batteries in the charging permission and discharging permission state, and setting the other storage battery in a charging forbiddance and discharging forbiddance state.

9. The method according to claim 3, wherein independently controlling the charging state and discharging state of each storage battery in the plurality of storage batteries comprises:

when a first storage battery in the plurality of storage batteries is in the charging permission and discharging permission state and a second storage battery is in the charging forbiddance and discharging forbiddance state, executing the following four operations to set the first storage battery in the charging forbiddance and discharging forbiddance state and set the second storage battery in the charging permission and discharging permission state:

① switching off a charging loop of a current storage battery;

② switching on a discharging loop of a next storage battery;

③ switching off a discharging loop of the current storage battery;

④ switching on a charging loop of the next storage battery, wherein an execution sequence of the above four operations meets one or more of the following conditions:

1) in a switching process, there is always a storage battery of which the discharging loop is in an on state in the current storage battery and the next storage battery;

2) in a switching process, when the discharging loop of one storage battery in the current storage battery and the next storage battery is in an on state, the charging loop of the other storage battery is always in an off state.

10. The method according to claim 3, further comprising:

executing one or more of the following abnormity processes:

when it is detected that a charging current/charging currents of one or more storage batteries exceeds/exceed a set charging protection threshold value in a charging process, setting the storage battery/batteries in the charging forbiddance state;

when it is detected that an abnormal discharging occurs to one or more storage batteries which are fully charged, setting the storage battery/batteries in the discharging forbiddance state; and when it is detected that a discharging current/discharging currents of one or more storage batteries exceeds/exceed a set discharging protection threshold value in a discharging process, setting the storage battery/batteries in the discharging forbiddance state.

11. A computer storage medium, in which computer-executable instructions are stored and used for executing the method according to claim 3.

12. A charging and discharging monitoring device for a storage battery device comprising a plurality of storage batteries connected in parallel, wherein the charging and discharging monitoring device comprises:
- a charging management module, configured to independently control charging state and discharging state of each storage battery in the plurality of storage batteries to implement charging of the storage battery device according to a set charging strategy; and
- a discharging management module, configured to independently control the charging state and discharging state of each storage battery in the plurality of storage batteries to implement discharging of the storage battery device according to a set discharging strategy,
- wherein the charging state comprises charging permission and charging forbiddance, and the discharging state comprises discharging permission and discharging forbiddance, and
- wherein the charging strategy used by the charging management module comprises:
- simultaneously charging the plurality of storage batteries; or
- performing hybrid charging on the plurality of storage batteries, namely simultaneously charging part of storage batteries in the plurality of storage batteries and independently charging the other storage batteries.

13. The charging and discharging monitoring device according to claim 12, wherein
the storage battery device is a storage battery device comprising a plurality of storage batteries connected in parallel, wherein the device comprises:
- a storage battery switching unit, the storage battery switching unit being arranged on a parallel branch circuit where each storage battery in the plurality of storage batteries is located and the storage battery switching unit being connected in series with the storage battery, wherein
- the storage battery switching unit comprises a current detection unit and a charging and discharging control unit which are connected in series, and the charging and discharging control unit comprises:
- a charging control unit, configured to switch on or switch off a charging loop of the storage battery, and
- a discharging control unit, connected in parallel with the charging control unit and configured to switch on or switch off a discharging loop of the storage battery, and
- the charging management module and the discharging management module are configured to independently control the charging state and discharging state of each storage battery in the plurality of storage batteries in the following manner:
- controlling the charging control unit to switch on a charging loop of the storage battery to set the storage battery in a charging permission state; controlling the charging control unit to switch off the charging loop of the storage battery to set the storage battery in a charging forbiddance state; controlling the discharging control unit to switch on a discharging loop of the storage battery to set the storage battery in a discharging permission state; and controlling the charging control unit to switch off the charging loop of the storage battery to set the storage battery in the charging forbiddance state.

14. The device according to claim 12, wherein
the charging management module is configured to independently control the charging state and discharging state of each storage battery in the plurality of storage batteries in the following manner:
when a storage battery is independently charged, setting the storage battery in a charging permission and discharging permission state, and setting the other storage batteries in a charging forbiddance and discharging forbiddance state,
or,
the charging management module is configured to independently control the charging state and discharging state of each storage battery in the plurality of storage batteries in the following manner:
when two storage batteries are simultaneously charged, setting a storage battery of the two storage batteries in the charging permission and discharging permission state, and setting the other storage battery in a charging permission and discharging forbiddance state; and
when a storage battery of the two storage batteries is fully charged at first, setting the storage battery in the charging forbiddance state, and continuing charging the other storage battery,
or,
the charging management module is configured to independently control the charging state and discharging state of each storage battery in the plurality of storage batteries in the following manner:
before two storage batteries are simultaneously charged, detecting voltages of the two storage batteries at first, then setting a storage battery of the two storage batteries of which the voltage is low in the charging permission state, and setting the other storage battery in the charging forbiddance state; and
when the two storage batteries are charged to be equal in voltage, setting the other storage battery in the charging permission state,
or,
the charging management module is configured to independently control the charging state and discharging state of each storage battery in the plurality of storage batteries in the following manner:
after the plurality of storage batteries are fully charged, setting a preferentially used storage battery in the charging permission and discharging permission state, and setting the other storage batteries in a discharging forbiddance state; and
setting a storage battery charged simultaneously with the preferentially used storage battery in the other storage batteries in the charging permission state, and setting a storage battery charged after the preferentially used storage battery in the charging forbiddance state.

15. The device according to claim 12, wherein
the discharging strategy used by the discharging management module comprises:
independently discharging the plurality of storage batteries; or
simultaneously discharging the plurality of storage batteries; or
performing hybrid discharging on the plurality of storage batteries, namely simultaneously discharging part of storage batteries in the plurality of storage batteries and independently discharging the other storage batteries.

16. The device according to claim 15, wherein
the discharging management module is configured to independently control the charging state and discharging state of each storage battery in the plurality of storage batteries in the following manner:

when a storage battery is independently discharged, setting the storage battery in the charging permission and discharging permission state, and setting the other storage batteries in the charging forbiddance and discharging forbiddance state, or, the discharging management module is configured to independently control the charging state and discharging state of each storage battery in the plurality of storage batteries in the following manner:

when two storage batteries are simultaneously discharged, setting a preferentially charged storage battery of the two storage batteries in the charging permission and discharging permission state, and setting the other storage battery in a charging forbiddance and discharging forbiddance state.

17. The device according to claim 12, wherein
the charging management module and the discharging management module are configured to independently control the charging state and discharging state of each storage battery in the plurality of storage batteries in the following manner:

when a first storage battery in the plurality of storage batteries is in the charging permission and discharging permission state and a second storage battery is in the charging forbiddance and discharging forbiddance state, executing the following four operations to set the first storage battery in the charging forbiddance and discharging forbiddance state and set the second storage battery in the charging permission and discharging permission state:

① switching off a charging loop of a current storage battery;

② switching on a discharging loop of a next storage battery;

③ switching off a discharging loop of the current storage battery;

④ switching on a charging loop of the next storage battery, wherein an execution sequence of the above four operations meets one or more of the following conditions:

1) in a switching process, there is always a storage battery of which the discharging loop is in an on state in the current storage battery and the next storage battery;

2) in a switching process, when the discharging loop of one storage battery in the current storage battery and the next storage battery is in an on state, the charging loop of the other storage battery is always in an off state.

18. The device according to claim 12, further comprising:
an abnormity processing module, configured to execute one or more of the following abnormity processes:

when it is detected that a charging current/charging currents of one or more storage batteries exceeds/exceed a set charging protection threshold value in a charging process, setting the storage battery/batteries in the charging forbiddance state;

when it is detected that an abnormal discharging occurs to one or more storage batteries which are fully charged, setting the storage battery/batteries in the discharging forbiddance state; and when it is detected that a discharging current/discharging currents of one or more storage batteries exceeds/exceed a set discharging protection threshold value in a discharging process, setting the storage battery/batteries in the discharging forbiddance state.

19. A storage battery charging and discharging management system, comprising:

a storage battery device comprising a plurality of storage batteries connected in parallel, wherein the device comprises:

a storage battery switching unit, the storage battery switching unit being arranged on a parallel branch circuit where each storage battery in the plurality of storage batteries is located and the storage battery switching unit being connected in series with the storage battery, wherein the storage battery switching unit comprises a current detection unit and a charging and discharging control unit which are connected in series, and the charging and discharging control unit comprises:

a charging control unit, configured to switch on or switch off a charging loop of the storage battery, and a discharging control unit, connected in parallel with the charging control unit and configured to switch on or switch off a discharging loop of the storage battery; and the charging and discharging monitoring device according to claim 12.

* * * * *